United States Patent [19]

Coburn et al.

[11] 4,215,609
[45] Aug. 5, 1980

[54] SLITTER SCORER HAVING UPPER AND LOWER PAIRS OF SHAFTS SELECTIVELY ROTATED BY A SINGLE DRIVE

[75] Inventors: Robert E. Coburn, Warminster; Benedict R. Buinewicz, Villanova, both of Pa.

[73] Assignee: Molins Machine Company, Inc., Cherry Hill, N.J.

[21] Appl. No.: 10,559

[22] Filed: Feb. 9, 1979

[51] Int. Cl.² .................. B26D 3/08; B26D 11/00
[52] U.S. Cl. ........................... 83/492; 83/106; 83/499; 83/549; 93/58.2 R
[58] Field of Search ............ 83/106, 479, 549, 481, 83/491, 492, 493, 494, 498, 425.4; 93/58.2 R

[56] References Cited

U.S. PATENT DOCUMENTS

| | | | |
|---|---|---|---|
| 2,291,789 | 8/1942 | Behrens | 83/492 X |
| 3,831,502 | 8/1974 | Tokuno | 83/106 X |
| 3,882,765 | 5/1975 | Tokuno | 83/106 X |

*Primary Examiner*—J. M. Meister
*Attorney, Agent, or Firm*—Seidel, Gonda, Goldhammer & Panitch

[57] ABSTRACT

An automatic slitter scorer apparatus is disclosed for slitting and scoring a corrugated paperboard web. The apparatus includes an upper pair of slitter shafts and an upper pair of scorer shafts, as well as a lower pair of slitter shafts and a lower pair of scorer shafts thereby defining two web paths through the apparatus. The web paths are used alternately. All of said shafts are selectively rotated by means of a single motor at one end of the apparatus. A set of trim chutes is provided for each pair of slitter shafts and is located downstream therefrom.

6 Claims, 17 Drawing Figures

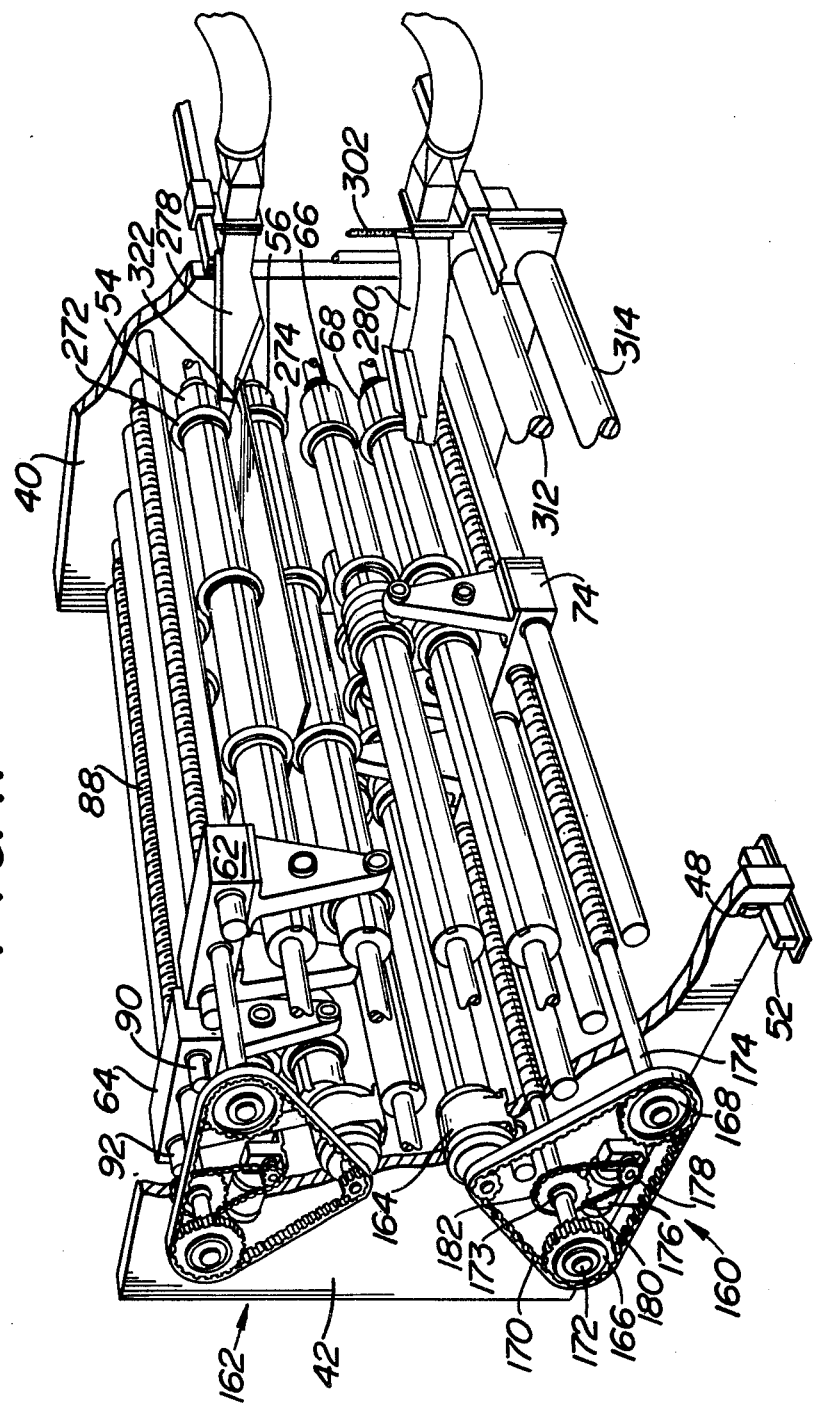

SLITTER SCORER HAVING UPPER AND LOWER PAIRS OF SHAFTS SELECTIVELY ROTATED BY A SINGLE DRIVE

BACKGROUND

A corrugator is an integrated group of machines for manufacturing sheets of double face corrugated paperboard and includes a slitter scorer which is conventionally located downstream from a rotary shear and upstream from a cut-off machine. The slitter scorer slits the web of double face corrugated board longitudinally and scores the web by applying crease lines longitudinally thereon. A number of slitter scorers having a plurality of web paths are known. For example, see U.S. Pat. Nos. 1,316,064; 4,010,677; 4,033,217; 3,831,929; 2,756,050; 3,882,765; and 3,831,502.

In the prior art, such as U.S. Pat. Nos. 1,316,064 and 3,831,502, dual slitter scorers are movable vertically between operative and inoperative positions. This concept of moving the slitter scorers vertically between operative and inoperative positions is objectionable from the viewpoint that heavy duty motors are needed for moving the large masses involved and complex heavy duty frames are required for the precision necessary for guiding such movement. Further, each slitter scorer unit requires its own drive motor for the slitter scorer shafts thereof. For example, see FIG. 9 of U.S. Pat. No. 3,831,502 wherein two motors designated by the numerals 30 are provided for movement with their respective slitter scorer units.

The present invention is directed to a solution of the problem of how to structurally interrelate and simplify the drive on a slitter scorer apparatus having two web paths, and yet provide apparatus which is so compact whereby it may be substituted for comparable apparatus in an existing operating corrugator.

SUMMARY OF THE INVENTION

The present invention is directed to slitter scorer apparatus having first and second upright side frames disposed respectively on each side of the web. Each side frame has an upstream end and a downstream end. An upper pair of rotatable slitter shafts is provided downstream from an upper pair of scorer shafts. A lower pair of rotatable slitter shafts are provided downstream from a lower pair of scorer shafts. The pairs of shafts are supported by said end frames. Mating pairs of blades are provided on each of the pairs of shafts. The upper pair of shafts define an upper web path and the lower pairs of shafts define a lower web path.

A single motor is supported by one of said end frames and coupled by a gear train to said pairs of shafts for selectively driving all of the pairs of shafts, or only the upper pairs of shafts, or only the lower pairs of shafts. A clutch means is associated with each pair of upper and lower shafts so that said shafts may be selectively driven by said motor.

It is an object of the present invention to provide an automatic slitter scorer having two web paths and having a size so that it may be readily substituted for an existing slitter scorer in an operating corrugator while utilizing a minimum number of motors and having a lubrication-free gear train between a motor and the shafts driven thereby.

Other objects will appear hereinafter.

For the purpose of illustrating the invention, there is shown in the drawings a form which is presently preferred; it being understood, however, that this invention is not limited to the precise arrangements and instrumentalities shown.

FIG. 1 is a longitudinal sectional view through the slitter scorer apparatus of the present invention.

FIGS. 2 and 3 together constitute a sectional view taken along lines 2, 3 in FIG. 1.

FIG. 17 is a perspective view showing the downstream end of the slitter scorer with portions broken away for purposes of illustration.

Figure 1:
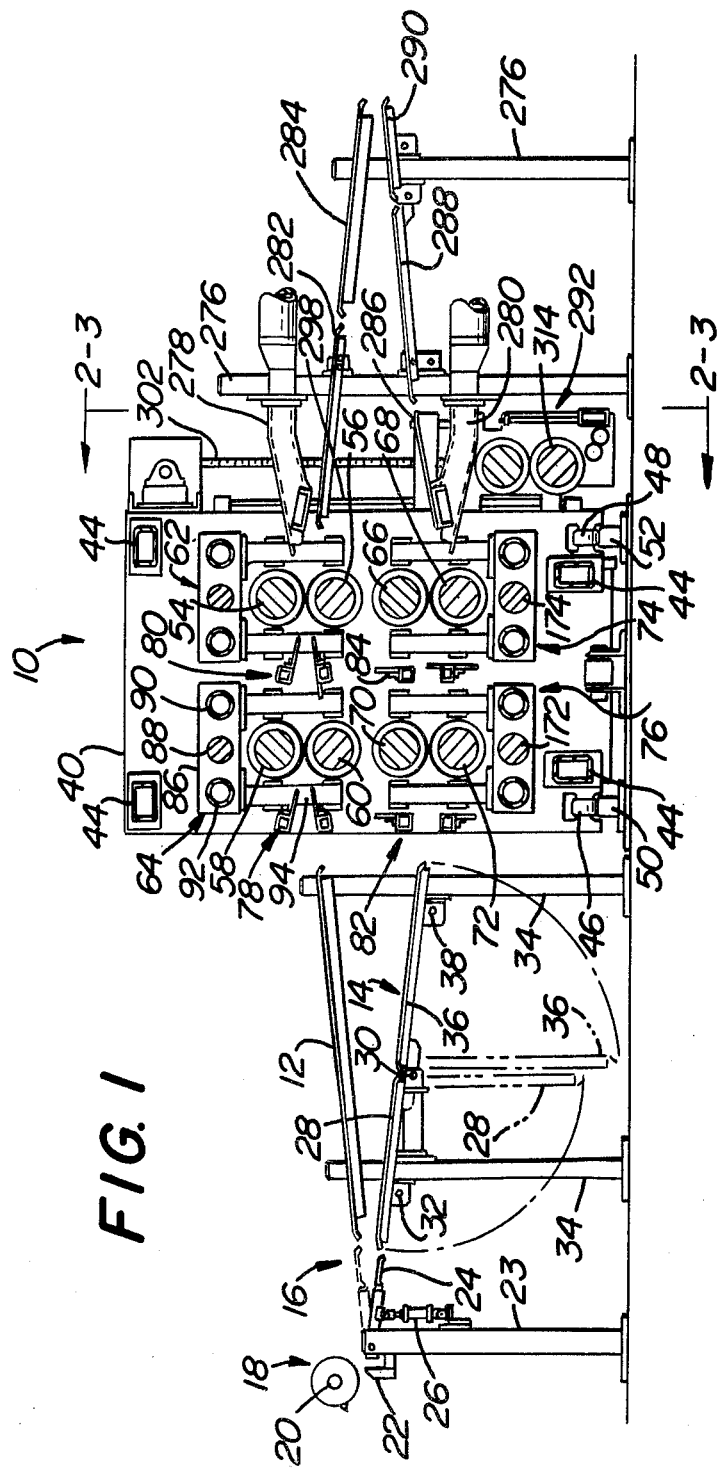

Referring to the drawings in detail, wherein like numerals indicate like elements, there is shown a slitter scorer in accordance with the present invention designated generally as 10. The slitter scorer 10 is downstream from the web guide means 12, 14 which in turn is downstream from a web diverter 16. The web diverter 16 is downstream from a rotary shear 18. The rotary shear 18 is downstream from the double facer machine which is not shown.

The rotary shear 18 may be any one of a wide variety of rotary shears known to those skilled in the art and used heretofore in corrugators. For purposes of illustration, the rotary shear 18 includes a shaft 20 extending transversely across and above the web path. The shaft 20 supports a cutting blade which projects radially outward therefrom. The cutting blade is adapted to cooperate with a mating stationary or anvil blade 22. When activated, the rotary shear 18 cuts the web transversely thereacross.

The web diverter 16 includes a diverter plate 24 pivotably supported by a frame 23 at its upstream end. Intermediate its upstream and downstream ends, the plate 24 is pivotably connected to one end of an air cylinder 26. The lower end of the air cylinder 26 is pivotably supported by a bracket on the frame 23. The diverter 16 is adapted to divert a web to the web guide means 12 or the web guide means 14.

The web guide means 12 is a stationary plate supported by the frame 34. The web guide means 14 is comprised of a pair of movable plates 28 and 36. The plate 28 is pivotably supported at its downstream end by pin 30. Plate 28 is retained in an operative solid line position as shown in FIG. 1 by a removable pin 32. When pin 32 is removed, the plate 28 may pivot to the phantom position as shown. The plate 36 is pivotably supported at its upstream end by the pin 38. Plate 36 is held in an operative position by the pin 38, removable from a hole in frame 34. When pin 38 is removed, the plate 36 may pivot to the phantom position as shown.

The web guide means 12 and 14 converge toward the diverter plate 24. The throat between the web guide means 12, 14 constitutes a point of possible jam-up of the incoming web. In order to be able to release any jam-up, and to have access to components of the web diverter 16 as well as the slitter scorer 10, the plates 28 and 36 are mounted for pivotable movement between operative and inoperative positions as shown in FIG. 1.

The slitter scorer 10 includes left and right side frames 40 and 42 which are upright, parallel, and extend in the direction of movement of the web which is from left to right in FIG. 1. The length of the frames 40, 42 in the direction of movement of the web is only about 50 inches whereby the slitter scorer 10 may be substituted for slitter scorers presently operating in the field.

Figure 3:
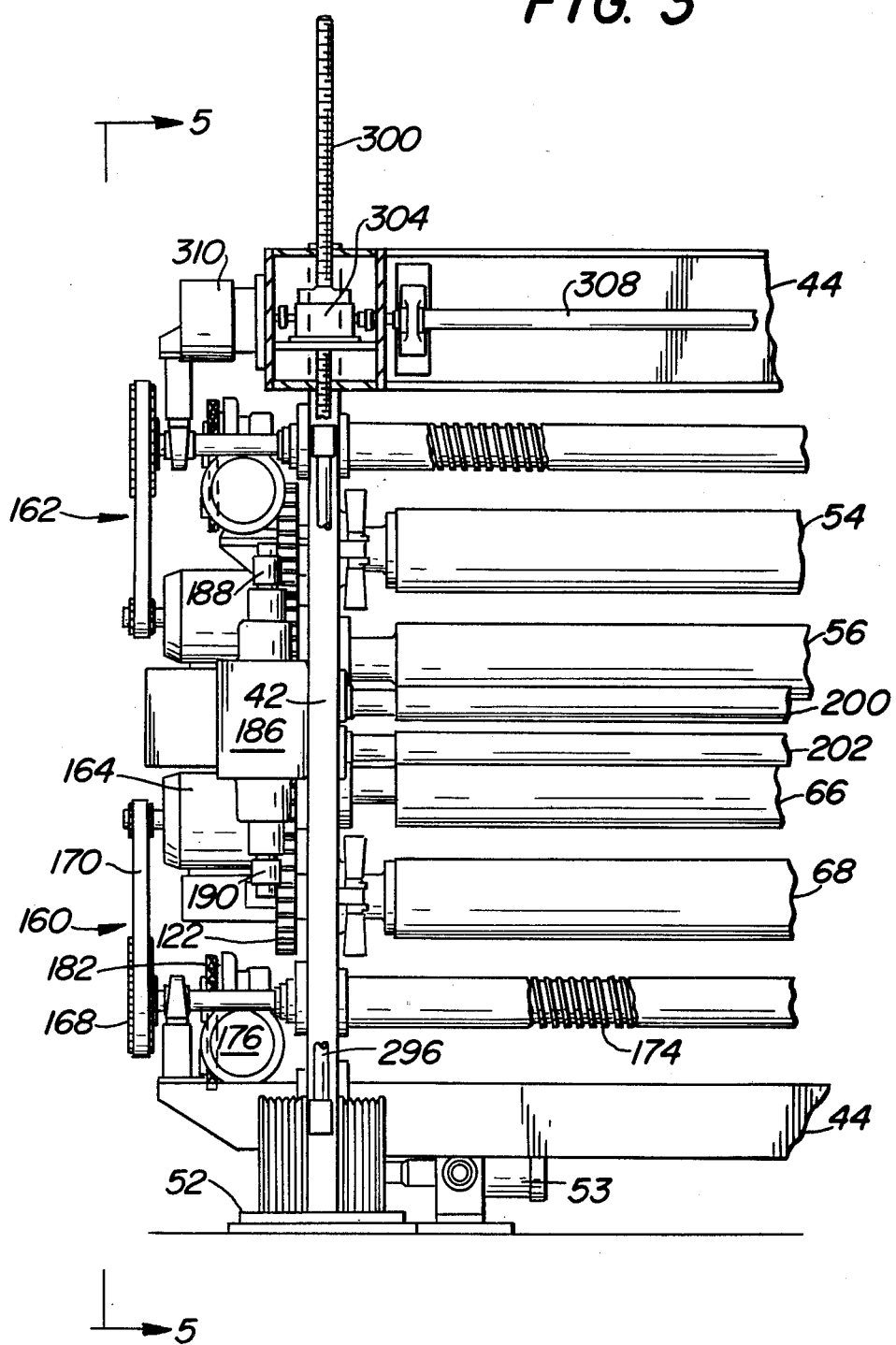
Figure 9:
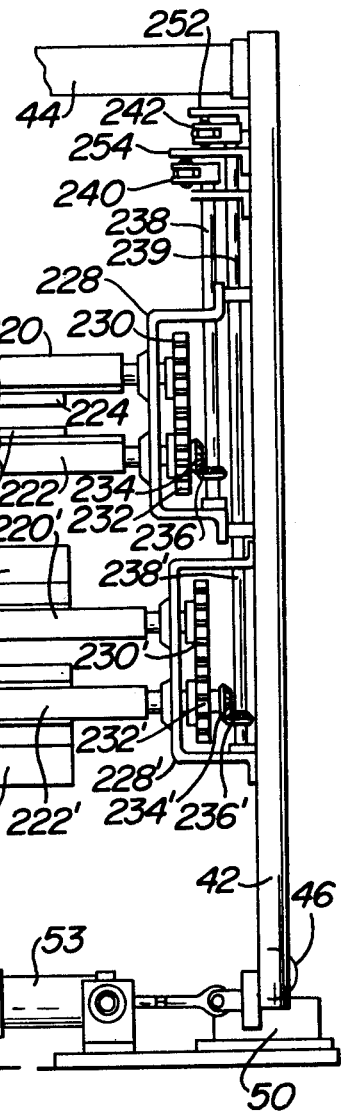
FIG. 9 is a end view as seen along the lines 9—9 in FIG. 8.

The side frames 40, 42 are rigidly interconnected by a plurality of beams designated 44 thereby defining a rigid frame. Each of the side frames 40, 42 is provided with rollers 46 and 48. The rollers 46 ride on a track 50. The rollers 48 ride on a track 52. A motor 53, see FIGS. 3 and 9, is connected to one of the frames, namely side frame 42 whereby the entire slitter scorer 10 may be shifted transversely of the web path for purposes of alignment.

Referring to FIG. 1, slitter scorer 10 includes an upper pair of slitter shafts 54, 56 which are rotatably supported by the side frames 40, 42. The shafts 54, 56 are downstream from a pair of upper scorer shafts 58, 60 similarly supported by the side frames 40, 42. The shafts 54, 56, 58, 60 define an upper horizontal web path through the slitter scorer 10. A web 322 is fed to the upper web path by way of the web guide means 12.

A lower pair of slitter shafts 66, 68 are provided below the shafts 54, 56. A lower pair of scorer shafts 70, 72 are provided beneath the shafts 58, 60. The shafts 66, 68, 70 and 72 define a lower horizontal web path through the slitter scorer 10. The web is fed to the lower web path by the web guide means 14. A tool positioner 64 is provided for the upper pair of scorer shafts 58, 60. A tool positioner 62 is provided for the slitter shafts 54, 56. A tool positioner 74 is associated with the shafts 66, 68 and is supported for reciprocation at an elevation below the elevation of shaft 68. A tool positioner 76 is provided for the shafts 70, 72 and is supported for reciprocation at an elevation below the elevation of shaft 72.

A web channel guide means 78 is provided for guiding the web from the upper web guide means 12 to the nip of the tools on shafts 58, 60. A web channel guide means 80 is provided between the vertical planes containing the axes of shafts 54, 56 and 58, 60 for guiding the web 322 between the upper scorer shafts 58, 60 and the upper slitter shafts 54, 56.

A web channel guide means 82 is provided for guiding the web from the lower web guide means 14 to the nip of the tools on the lower scorer shafts 70, 72. A web channel guide means 84 is provided directly below the web guide means 80 for guiding a web from the lower scorer shafts 70, 72 to the lower slitter shafts 66, 68. The web channel means 78, 80, 82 and 84 will be described in greater detail hereinafter. It will be noted that each of the web channel guides 78, 80, 82 and 84 is positioned in a location so as to interfere with movement of at least one of the tool positioners 62, 64, 74, and 76. As will be made clear hereinafter, means are provided for moving the web channel guide means 78, 80, 82 and 84 from an operative position as shown to an inoperative position to thereby eliminate the possible interference between moving parts.

Each of the tool positioners 62, 64, 74, 76 includes a carriage threadedly coupled to a lead screw drive disposed between a pair of guide tubes. The tool positioners are preferably of the type disclosed herein. Since the tool positioners are identical, only tool positioner 64 will be described in detail.

The tool positioner 64 includes a carriage 86 driven by a reversible lead screw drive 88. The drive 88 is disposed between the carriage guide tubes 90, 92. The carriage 86 has a pair of legs 94 which straddle the shafts 58, 60. Each leg 94 has a pair of tool contact members. Each tool contact member is associated with one of the shafts 58, 60 whereby each tool can be moved by oppositely disposed contact members. Each tool positioner 62, 64, 74, 76 has a parking or inoperative position adjacent frame 40.

Each tool positioner is substantially similar to that shown in patent application Ser. No. 908,608 in the name of Robert E. Coburn and assigned to the assignee herein. Patent application Ser. No. 908,608 is included herein by reference to describe the apparatus more explicitly.

Figure 2:
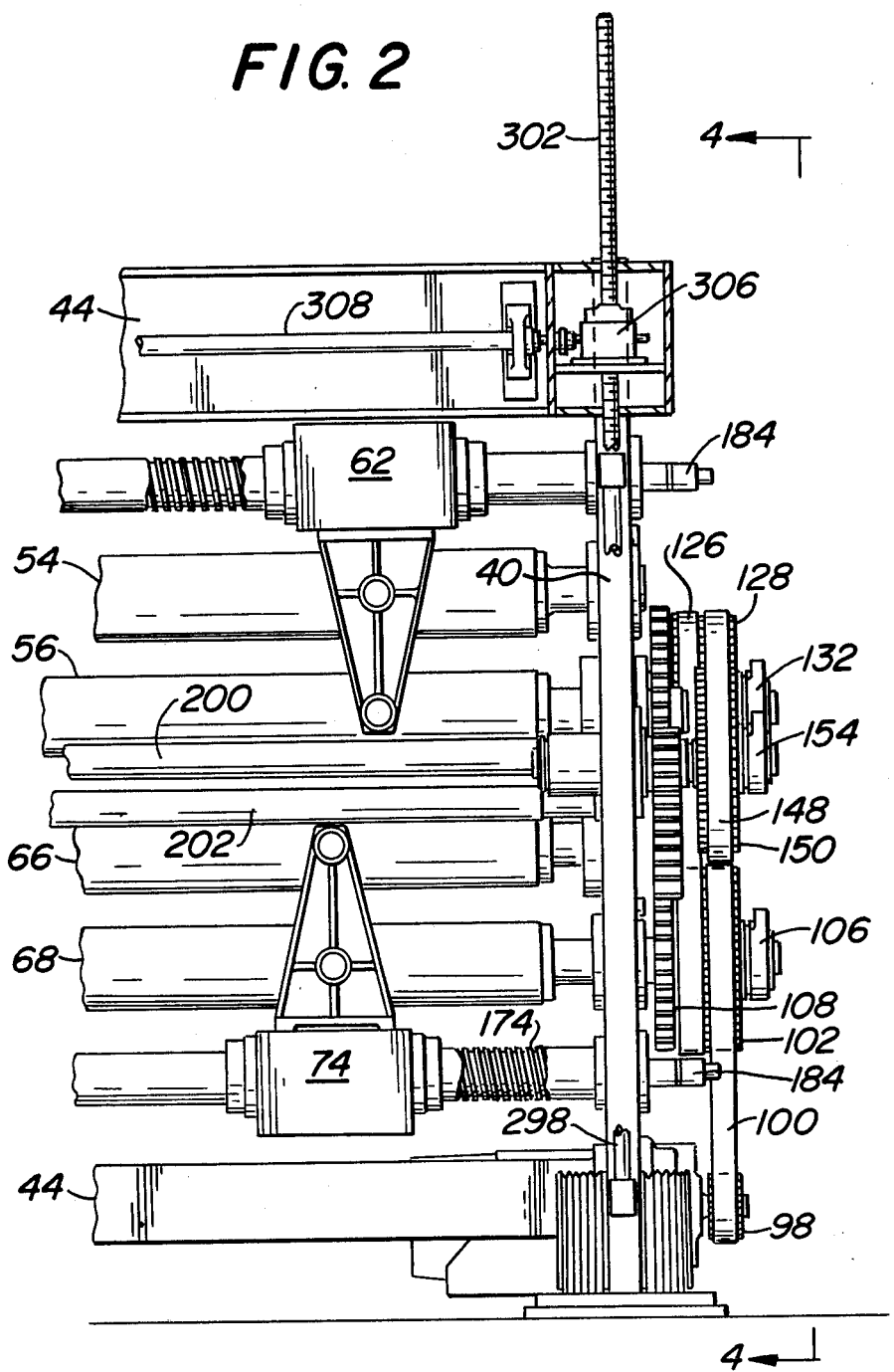
Figure 4:
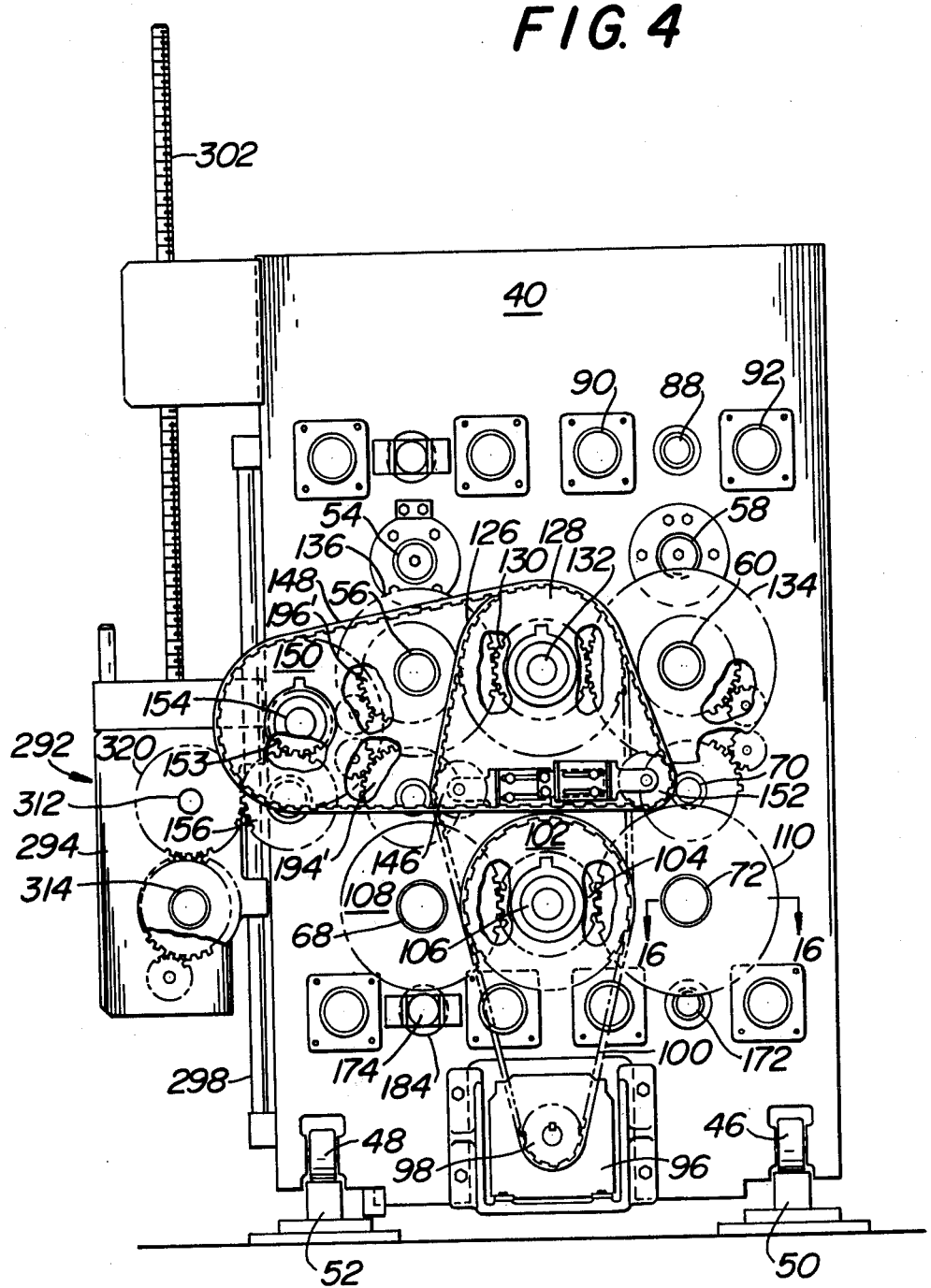
FIG. 4 is an end view as seen along the lines 4—4 in FIG. 2.

Referring to FIGS. 2 and 4, there is shown side frame 40 which supports motor 96. The motor 96 is supported by brackets adjacent the bottom of side frame 40 for easy access and maintenance. Motor 96 has an output gear 98. Gear 98 is meshed with teeth on the inner periphery of timing belt 100. Belt 100 extends around gear 102. As shown more clearly in FIG. 2, gear 102 is at least twice as wide as belt 100.

Gear 102 is mounted on a stub shaft and is connected to gear 104 coaxial therewith by way of clutch 106. Gear 104 is disposed between and meshed with gears 108, 110. Gear 108 drives shaft 68 and gear 110 drives shaft 72. Gear 108 has fewer teeth than gear 110 whereby slitter shaft 68 will rotate faster than scoring shaft 72.

Figure 16:
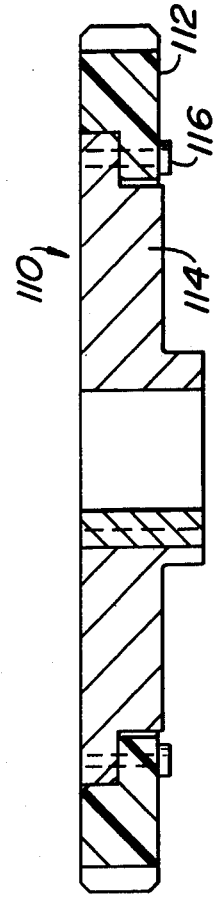
FIG. 16 is an enlarged sectional view taken along the line 16—16 in FIG. 4.

Gears 108 and 110 are for the number of teeth as mentioned above. As shown in FIG. 16, gear 110 has an annulus 112 made from a polymeric plastic material with the gear teeth on its outer periphery. The annulus 112 is removably attached to metal hub 114 by bolts 116. The polymeric plastic material for the annulus 112 is preferably a self-lubricating material such as the material sold commercially under the trademark NYLATRON. As a result of the use of such material, the gear train requires no lubrication and running noise is attenuated.

Figure 5:
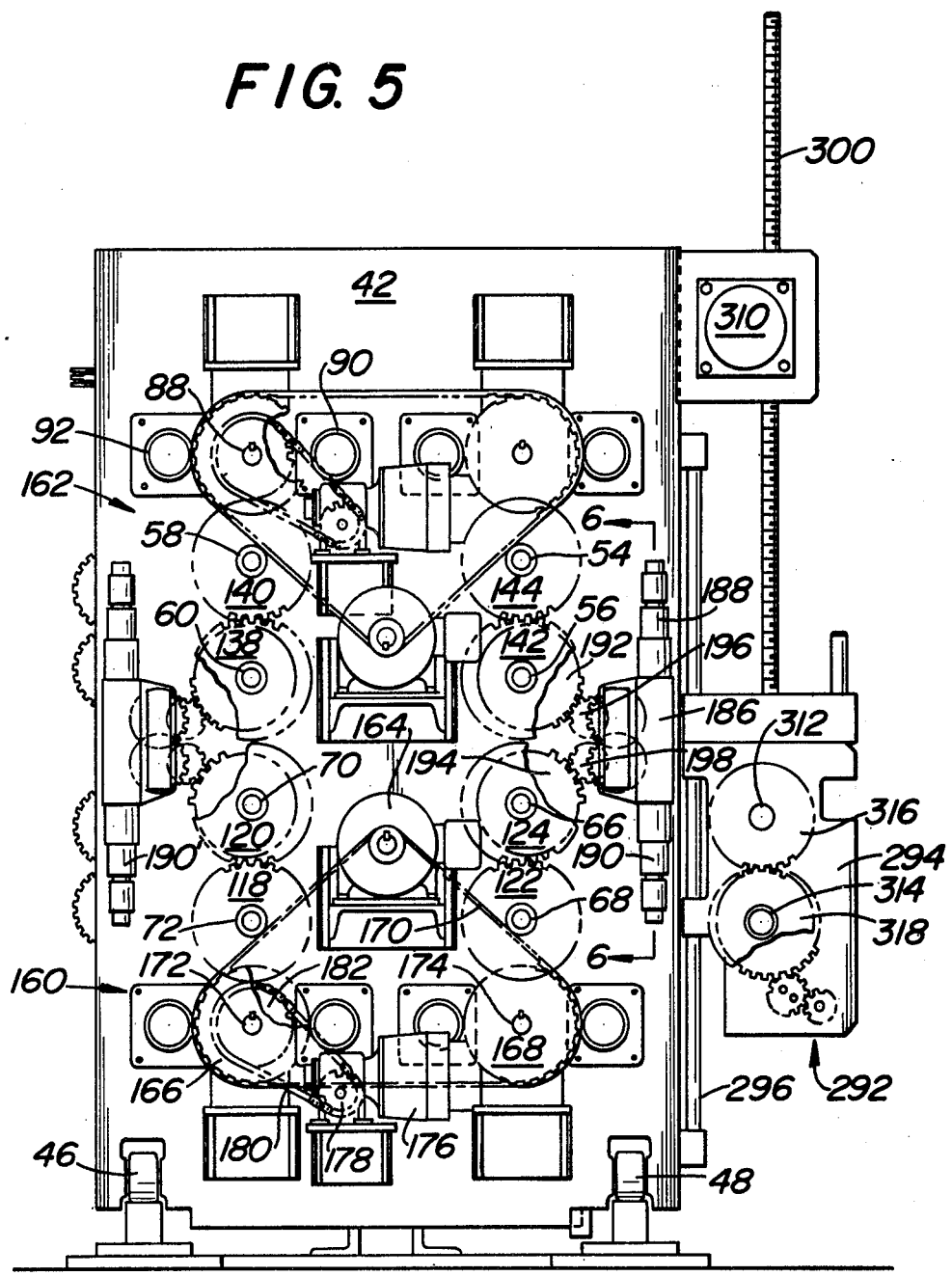
FIG. 5 is an end view as seen along the lines 5—5 in FIG. 3.

As shown in FIG. 5, gear 118 is connected to the end of shaft 72 remote from the gear 110. Gear 118 is meshed with gear 120 on shaft 70 thereabove whereby shafts 70, 72 rotate in opposite directions at the same speed. A gear 122 is connected to the end of shaft 68 remote from the gear 108. Gear 122 is meshed with gear 124 on shaft 66 thereabove whereby shafts 66, 68 rotate in opposite directions at the same speed. At this point, it will be noted that if clutch 106 is engaged, then shafts 66, 68, 70 and 72 of the lower slitter scorer unit are rotating. If clutch 106 is not engaged, gear 102 continues to be driven by motor 96.

A second timing belt 126 extends around gear 102 parallel with belt 100. See FIGS. 2 and 4. Belt 126 couples gear 102 to gear 128 thereabove. Gear 128 is mounted on a stub shaft and is coupled to a gear 130 coaxial therewith by way of clutch 132. Gear 130 is disposed between and meshed with gear 134 on shaft 60 and gear 136 on shaft 56. Gears 134 and 136 are identical with gears 110 and 108 respectively.

As shown in FIG. 5, a gear 138 is secured to shaft 60 at the end thereof remote from gear 134. Gear 138 is meshed with gear 140 on shaft 58 thereabove. Also, a gear 142 on shaft 56 is meshed with gear 144 on shaft 54. An adjustable tensioner 146 is provided for belt 126. If clutch 132 is engaged, motor 96 drives shafts 54, 56, 58 and 60 of the upper slitter scorer unit irrespective of the condition of clutch 106.

A third timing belt 148 extends around gear 128 parallel with belt 126. Belt 148 couples gear 128 to gear 150 on a stub shaft. An adjustable tensioner 152 is provided for belt 148. Gear 150 is connected to gear 153 coaxial therewith by way of clutch 154. Gear 153 is meshed with an idler gear 156. The purpose of idler gear 156 will be made clear hereinafter. At this point, it will be noted that if clutch 154 is engaged, motor 96 drives gear 156 irrespective of the condition of clutches 106 and 132.

As shown more clearly in FIG. 5, a fast-slow drive system 160 is provided for the lower slitter scorer unit and a similar drive system 162 is provided for the upper slitter scorer unit. Systems 160 and 162 are identical. Hence, only system 160 will be described in detail.

The system 160 is designed to simultaneously move the tool positioners 74, 76 in the same direction at a fast speed of about 2½ inches per second when large movements are required and at a low speed of about ⅛ inch per second wherein fine adjustments are required.

The system 160 includes a main drive motor 164 which is preferably a two horsepower AC motor whose output is coupled to gears 166 and 168 by way of a timing belt 170. Gear 166 is connected to the lead screw 172 for tool positioner 76. Gear 168 is connected to the lead screw 174 for the blade positioner 74.

The slow speed drive for the tool positioners 74, 76 includes a motor 176. Motor 176 is preferably a one-quarter horsepower gear head motor. Motor 176 is connected to a gear box having an output sprocket 178. Sprocket 178 is meshed with chain 180. Chain 180 is meshed with sprocket 182 which is connected to the lead screw 172 by way of a clutch 173 (FIG. 17). When operating in a high speed mode, clutch 173 is disengaged. When operating in a low speed mode, the clutch 173 is engaged and motor 164 is de-energized. Thus, the motors 164 and 176 are operated alternately. One of the lead screws 172, 174 such as screw 174 is provided with an encoder 184. See FIG. 4. The encoder 184 is a conventional device which sends out electrical pulses corresponding to the revolutions of the lead screw 174. When the tool positioner 74 is within one inch of its desired position, circuitry not shown deenergizes motor 164 and energizes motor 176 as well as the clutch 173 supporting sprocket 182.

A tool gap control device is provided for shafts 56, 66. A similar device is provided for shafts 60, 70. Since the devices are identical, only the device associated with shafts 56, 66 will be described in detail.

Figure 6:
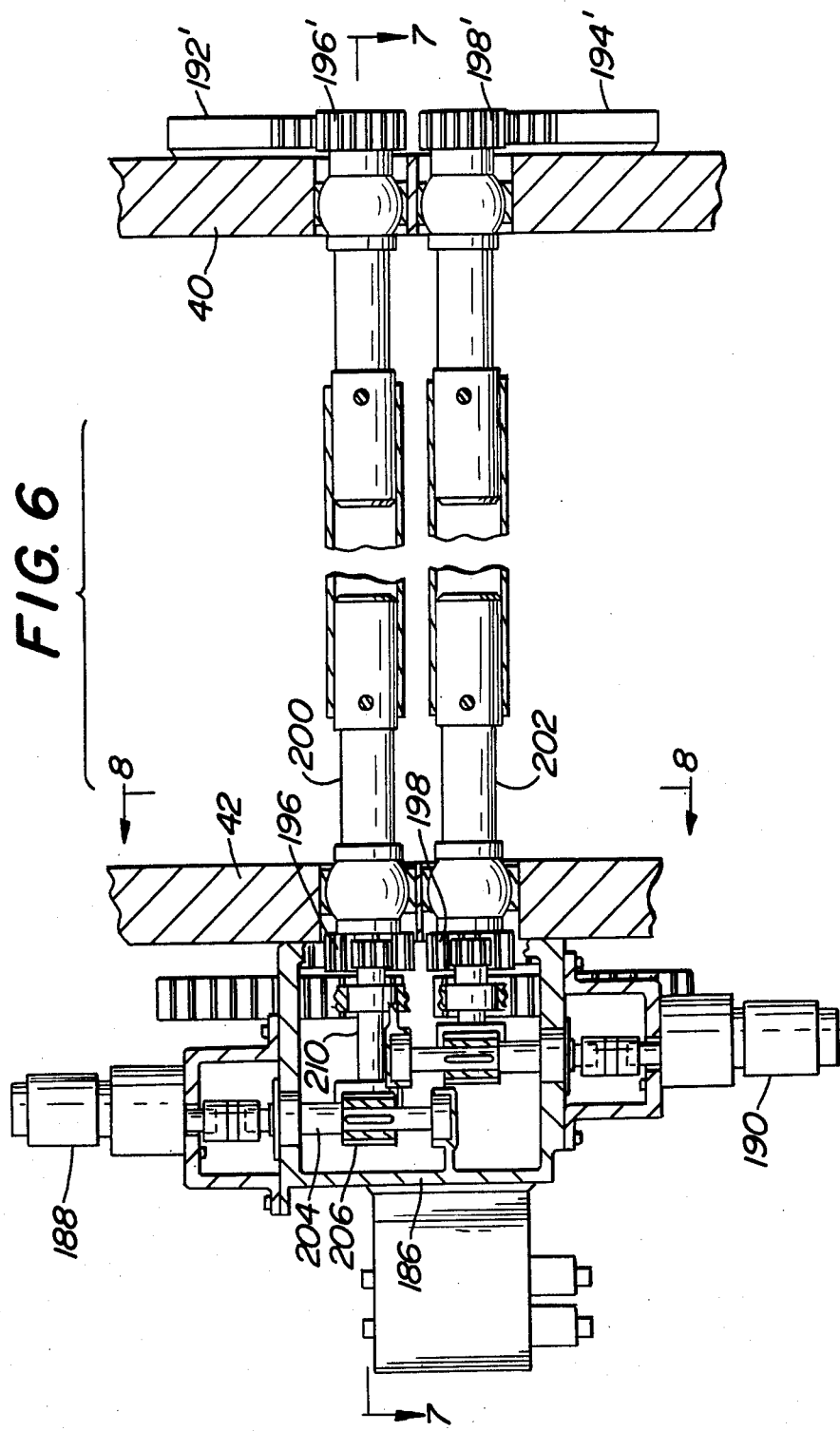
FIG. 6 is a sectional view taken along the lines 6—6 in FIG. 5.
Figure 7:
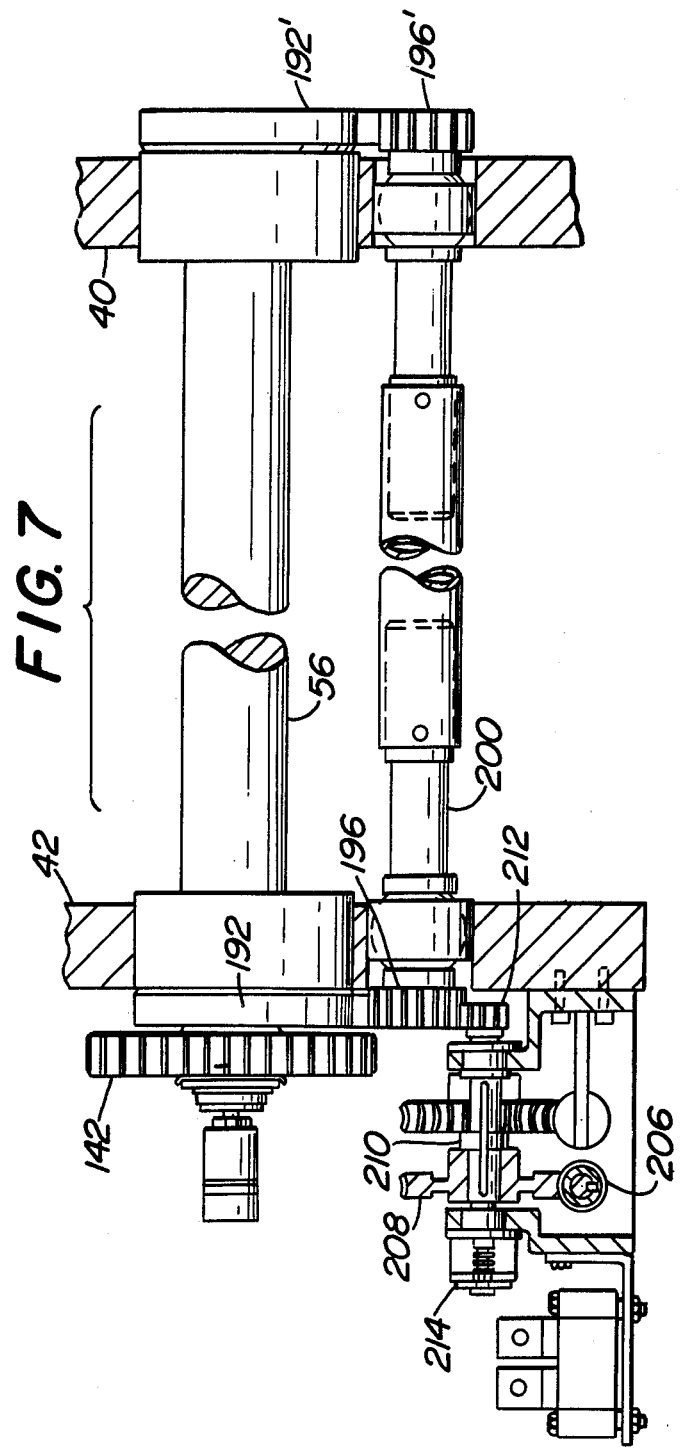
FIG. 7 is a sectional view taken along the lines 7—7 in FIG. 6.

Referring to FIGS. 5-7 inclusive, the control device for shafts 56, 66 includes a housing 186 supported by the side frame 42. The upper end of the housing 186 supports an air motor 188. The lower end of the housing 186 supports an air motor 190. As will be described hereinafter, the motor 188 is utilized to adjust the position of shaft 56 relative to its mating shaft 54 while motor 190 is utilized to adjust the position of shaft 66 relative to its mating shaft 68. In this manner, the amount of overlap of the mating tools such as slitter blades may be adjusted. A similar device provides for a control of the gap between mating tools such as scorers on the shafts 58, 60, and 70, 72.

A bearing housing for the shaft 56 has an eccentrically located gear segment 192 on its outer peripheral surface. A similar bearing housing for shaft 66 has a gear segment 194. See FIG. 5. The teeth on the periphery of gear segment 192 mesh with a pinion gear 196. The teeth on the periphery of gear segment 194 mesh with a pinion 198.

The pinion 196 is connected to one end of a shaft 200. Shaft 200 is parallel to and adjacent to shaft 56. A pinion 196' is connected to the other end of shaft 200 beyond the side frame 40. See FIGS. 6 and 7. Pinion 196' meshes with a bearing housing having a gear segment 192' at the other end of shaft 56. The gear segments 192 and 192' are identical and are at opposite ends of the shaft 56.

Pinion 198 is connected to one end of shaft 202. Shaft 202 is parallel to and adjacent to shaft 70. A pinion 198' is connected to the other end of shaft 202 beyond the side frame 40. Pinion 198' meshes with the gear segment 194' which is part of the bearing housing for the other end of shaft 66. Motor 188 is coupled to the pinion 196 and motor 190 is connected to the pinion 198. Since the motors 188, 190 are connected to their respective pinions in the same manner, only the coupling between motor 188 and pinion 196 will be described in detail. See FIGS. 6 and 7.

The output shaft 204 of the motor 188 is supported by bearings at ends thereof on the housing 186. Shaft 204 has a worm 206 attached thereto. Worm 206 is meshed with a worm gear 208 on shaft 210. Shaft 210 is perpendicular to shaft 204 and parallel to shaft 200. A pinion 212 on shaft 210 is meshed with pinion 196. See FIG. 7. On shaft 210, remote from the pinion 212, there is provided a feedback potentiometer 214. The potentiometer 214 is a conventional device which is used to stop the motor 188 when the desired blade overlap is attained.

The motors 188, 190 are reversible and preferably operated independently of one another. When motor 188 is operating, worm 206 drives the gear 208 to thereby cause pinion 212 to rotate pinion 196. As pinion 196 rotates, pinion 196' also rotates. The pinions 196, 196' rotate the gear segments 192, 192' thereby moving the axis of shaft 56 toward or away from the axis of shaft 54. The amount of such movement is quite small so as not to break the mesh between the gears 142, 144.

Referring initially to FIG. 1, as described above, there is provided web channel guide means 78, 80, 82 and 84. As shown more clearly in FIGS. 8-10, a device 217 is provided for actuating the web channel guide means 78. Similar devices 219, 216, 218 are provided for actuating the web channel guide means 80, 82, 84, respectively. Since the devices 216, 217, 218 and 219 are identical, only devices 216 and 217 will be described in detail.

Figure 8:
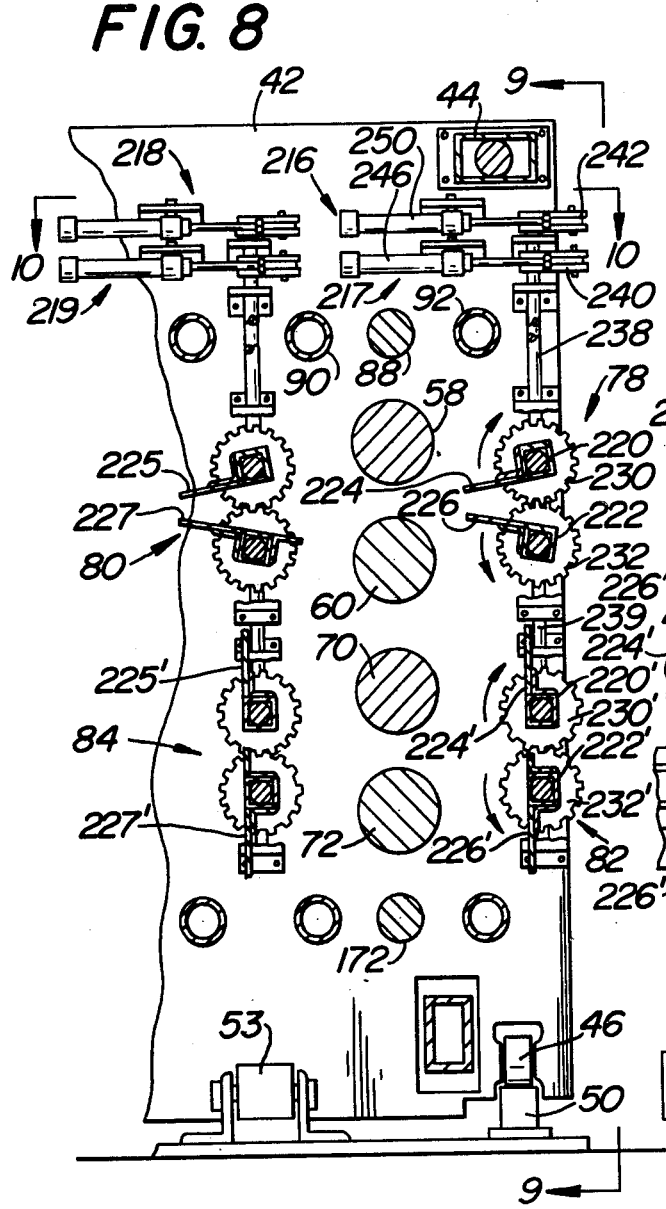
FIG. 8 is a sectional view taken along the lines 8—8 in FIG. 6.

The devices 216 and 218 are arranged to simultaneously actuate the web channel guide means 82 and 84. Likewise, the devices 217 and 219 are arranged to simultaneously active the web channel guide means 78 and 80. The components associated with web channel guide means 78 will be described in detail with corresponding elements being provided with corresponding primed numerals in connection with the web channel guide means 82. Referring to FIGS. 8 and 9, the web channel guide means 78 includes parallel shafts 220 and 222 extending between the end frames 40, 42. Shaft 220 has a guide plate 224. Shaft 222 has a guide plate 226. The guide plates 224, 226 converge toward the nip associated with the tools on shafts 58, 60 when in an operative disposition. The device 217, when actuated, causes the plates 224, 226 to rotate through a limited arc of approximately 90° and in opposite directions. This will enable the plates 224, 226 to pivot out of the way of the tool positioner 64. Actuation of device 219 will enable the plates 225 and 227 to pivot out of the way of tool positioner 62. See the arrows in FIG. 8.

The shafts 220 and 222 are supported on the side frame 42 by way of a bracket 228. Shaft 220 has a gear 230 on one end thereof meshed with a gear 232 on the end of shaft 222. See FIG. 9.

A bevel gear 234 is connected to one of the shafts such as shaft 222. Bevel gear 234 meshes with a bevel gear 236 on a vertically disposed shaft 238. Shaft 238 is supported for rotation about its longitudinal axis by means of the bracket 228. As shown more clearly in FIG. 10, a lever 240 has one end fixedly secured to the upper end of shaft 238. The other end of lever 240 is connected to one end of a piston rod 244 which extends from a pneumatic cylinder 246.

Figure 10:
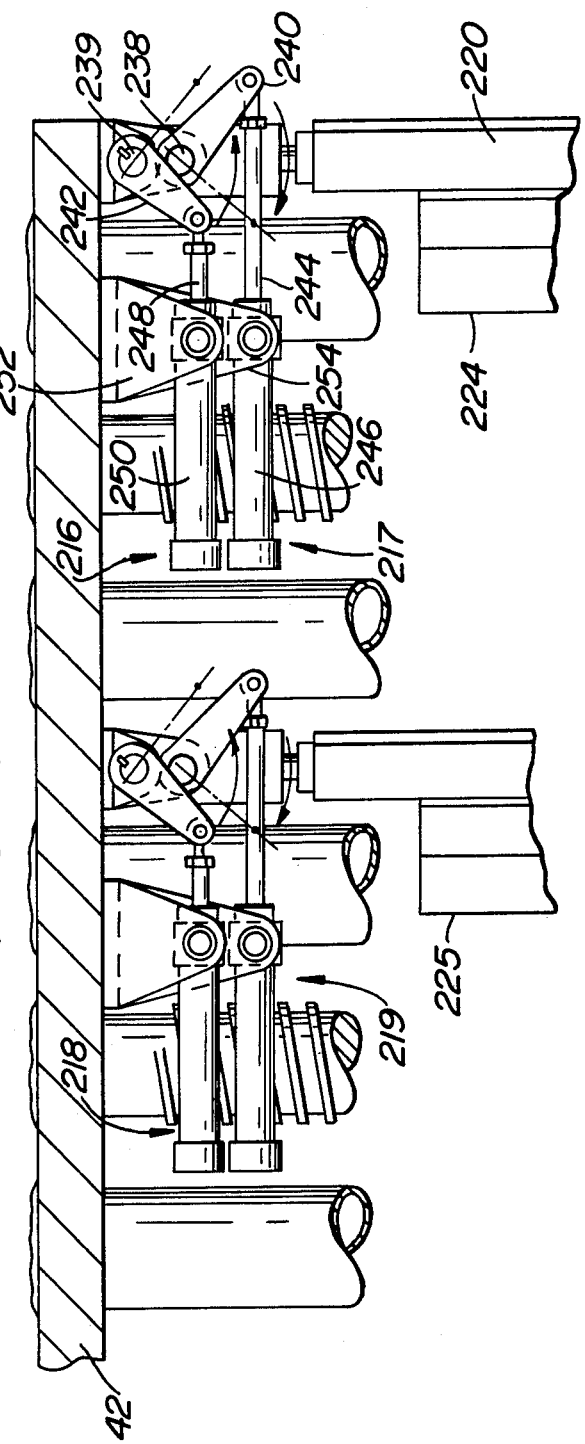
FIG. 10 is a sectional view taken along the line 10—10 in FIG. 8 and on an enlarged scale.

When the piston rod 244 is in the solid line position shown in FIG. 10, the plates 224 and 226 are in the solid line position as shown in FIG. 8. When the piston rod 244 is retracted, the shaft 238 is rotated through an arc of approximately 90° in a clockwise direction as seen in FIG. 10 and the plates 224, 226 are also pivoted 90°, plate 224 moving clockwise and plate 226 moving counterclockwise in FIG. 8.

Rotation of shaft 238 causes rotation of shaft 222 by way of the meshing bevel gears 234, 236. Since the shafts 220 and 222 are coupled together by the meshing gears 230, 232, the shafts 220, 222 rotate in opposite directions through an arc of approximately 90° whereby the plates 224, 226 are generally vertically disposed with plate 224 extending upwardly and plate 226 extending downwardly.

Device 216 actuates plate 224' and 226' in a similar fashion through cylinder 250, piston rod 248, lever 242 and vertical shaft 239. Vertical shaft 239 is coupled to bevel gear 236' which meshes with bevel gear 234'. Bevel gear 234' is coupled to shaft 222'. Coupled to the end of shaft 222' is gear 232' which meshes with gear 230' on the end of shaft 220'. As previously described, actuation of cylinder 250 rotates, shaft 239 moves the plates 224' and 226' to a vertical disposition to allow passage of tool positioner 76.

Since the upper slitter-scorer units will be operated while the lower slitter-scorer units will be readjusted, and vice versa, it is preferable that devices 217 and 219 are operated simulateously and that devices 216 and 218 are likewise operated simultaneously.

The cylinders 250 and 246 are at different elevations as shown in FIG. 8. Cylinder 250 is supported by bracket 252 on the side frame 42. A similar bracket 254 supports the cylinder 246.

Figure 11:
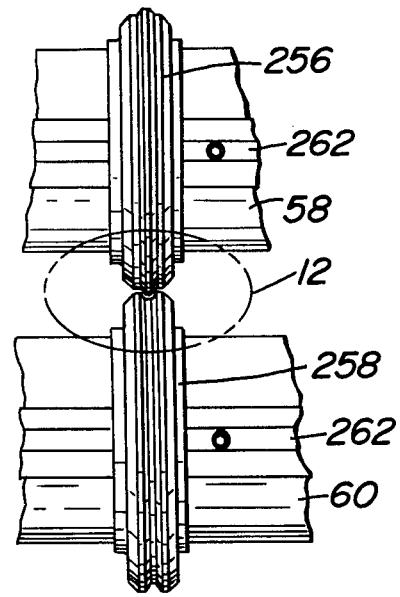
FIG. 11 is an elevation view showing a pair of mating scorers.
Figure 12:
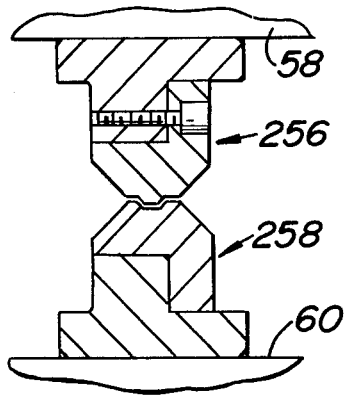
FIG. 12 is an enlarged sectional view of the portion encircled in FIG. 11.

In FIG. 11, there is a partial elevation of shafts 58 and 60. Shafts 70 and 72 are similarly constructed. Shafts 58 and 70 have a male scorer 256 which cooperates with a mating female scorer 258 on the mating shafts such as shaft 60. As shown in greater detail in FIG. 12, the male and female scorers are removably attached by threaded fasteners to a hub.

Each of the shafts 54, 56, 58, 60, 66, 68, 70 and 72 is preferably constructed so as to have means for selectively locking the tools to their respective shafts while at the same time is constructed to permit the tools on the respective shafts to be shifted in an axial direction along their shafts. Such means will be described in connection with shaft 58.

Figure 15:
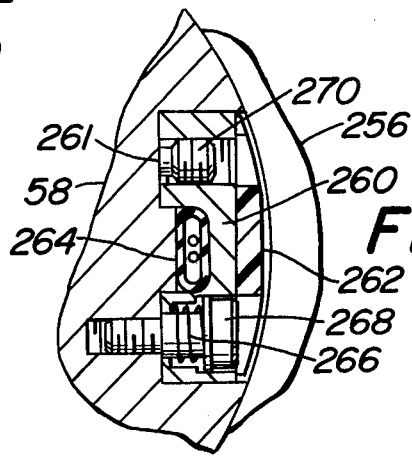
FIG. 15 is a partial transverse sectional view through a slitter shaft or scorer shaft.

As shown in FIG. 15, shaft 58 has a peripheral longitudinally extending slot. The slot has a bottom wall 261. A housing 260 is mounted in the slot and is guided for movement in a radial direction. The housing 260 has a frictional drag surface 262 made from a polymeric plastic material. Housing 260 and its drag surface 262 are biased radially outwardly into locking contact with the inner periphery of the scorer 256 by means of an expandable chamber means 264. Spring 266 cooperates with the head on a fastener 268 and a flange on the housing 260 to bias the housing 260 radially inwardly. The bias of spring 266 is limited by a screw 270 which is threaded to the housing 260 and contacts at the bottom wall 261. The screw 270 may be screwed to a position so as to cause the surface 262 to project beyond the periphery of the shaft 58 and thereby provide a drag force on the scorer 266. The drag force is sufficient to maintain the scorer 256 in a predetermined position along the shaft 58 prior to pressurizing the chamber means 264. Thus, a frictional drag is provided on the tools when the chamber means 264 is unpressurized. A more detailed description of the shaft locking mans is included in patent application Ser. No. 908,608 of Robert E. Coburn.

Figure 13:
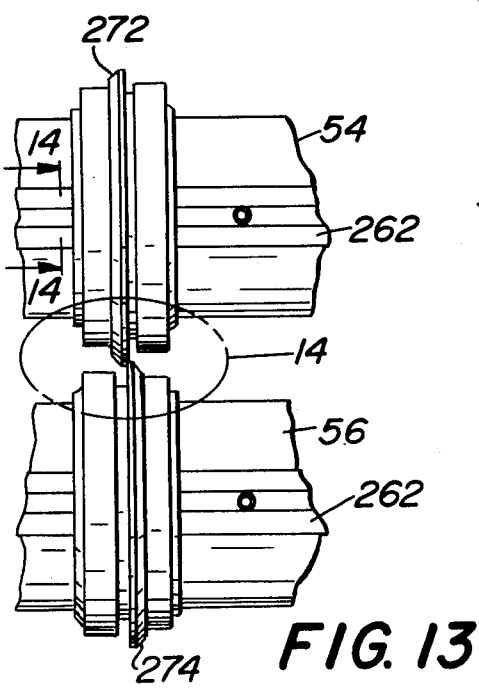
FIG. 13 is an elevation view showing mating slitter blades.
Figure 14:
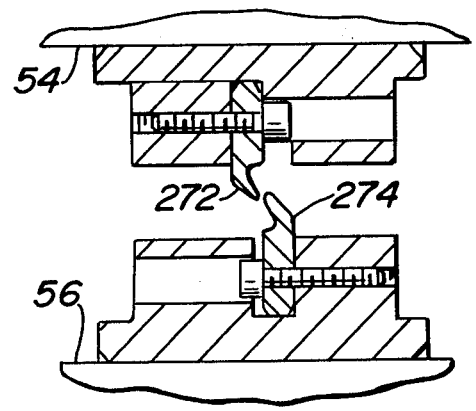
FIG. 14 is an enlarged sectional view of the encircled portion in FIG. 13.

Referring to FIGS. 13 and 14, there is shown a partial elevation view of slitter shaft 54 having a slitter blade 272 and a slitter shaft 56 having a mating slitter blade 274. The slitter blades 272 and 274 are removably attached by threaded fasteners to their respective hubs as shown more clearly in FIG. 14. Shafts 66, 68 are provided with similar slitter blades.

The above completes the description of the slitter scorer apparatus 10. The following auxiliary equipment may be used in conjunction with the slitter scorer apparatus 10. If the web being processed is trimmed along its side edges, the trim is removed by way of a trim chute. One chute is provided for each outside edge portion of the web. Hence, there are two chutes for the upper web path and two chutes for the lower web path.

Referring to FIGS. 1 and 17, there is shown a frame 276 downstream from the slitter scorer apparatus 10. The frame 276 supports a pair of upper trim chutes 278 (only one shown). The upper trim chutes 278 are movable toward and away from one another and are also movable to a position so as to be free from interference with the tool positioner 62.

The frame 276 also supports a pair of lower trim chutes 280 (only one shown). The trim chutes 280 are likewise movable toward and away from each other and chute 280 is shown pivoted to a position so as to avoid an interference with the tool positioner 74. The upper web path includes guide plates 282 and 284 supported by the frame 276. The lower trim chutes 280 support a plate 286 which is aligned with the guide plates 288, 290 on the frame 276. Plates 286, 288 and 290 guide the web when the web is passing through the lower web path of the slitter scorer apparatus 10.

Another device which may be used with the basic slitter scorer apparatus 10 is an auxiliary station designated generally as 292. See FIGS. 1, 3 and 5. For clarity of illustration, the auxiliary station 292 has been deleted from FIGS. 2 and 3.

As shown in FIGS. 4 and 5, the auxiliary station 292 includes a carriage 294. A vertically disposed guide rod 296 is provided on the end of frame 42 and a similar guide rod 298 is provided on the end of frame 40. The carriage 294 has a bore at each end thereof and through which one of the guide rods 296, 298 extends. Hence, the carriage 294 is guided for vertical reciprocation at the downstream end of the slitter scorer apparatus 10.

As shown more clearly in FIGS. 2 and 3, a lead screw 300 is disposed adjacent and parallel to the guide rod 296. The lower end of screw 300 is threadedly coupled to the carriage 294. A similar lead screw 302 is provided adjacent the guide rod 298 and is similarly coupled to the carriage 294. Screw 300 extends through a right angle drive 304. Screw 302 extends through a right angle drive 306. The right angle drives 304, 306 are interconnected by a horizontally disposed shaft 308. One of the right angle drives, such as drive 304 is coupled to a reversible electric drive motor 310. Hence, motor 310 is operative to elevate the carriage 294 from the inoperative position shown in FIG. 1 to the operative position shown in FIGS. 4 and 5 so as to be aligned with the lower web path of the slitter scorer apparatus 10.

The carriage 294 supports a pair of parallel shafts 312, 314. At one end of the shafts, as shown in FIG. 5, shaft 312 has a gear 316 which is meshed with a mating gear 318. Gear 316 is preferably constructed like gear 110. At the other end of shaft 312, there is provided a gear 320 as shown more clearly in FIG. 4. Gear 320 is adapted to mesh with gear 156 in the operative disposition of the auxiliary station 292 whereby the shafts 312, 314 may be driven by the motor 96. The shaft 312 is preferably provided with an eccentrically mounted bearing housing having a gear segment mating with a pinion to facilitate adjustment of shaft 314 toward and away from shaft 312 in the same manner as described above in connection with shafts 56, 66.

The auxiliary station 292 is utilized for processing special orders which are generally short orders requiring unique slitting and/or scoring. The shafts 312, 314 may be provided with mating pairs of scorers, or mating pairs of slitting blades, or mating pairs of both slitting blades and scorers. When the auxiliary station 292 arrives at the operative position shown in FIGS. 4 and 5, the carriage 294 trips a limit switch which shuts off the power to motor 310 thereby de-energizing the same.

In view of the detailed discussion set forth above and the illustrations in the drawings attached hereto, a detailed explanation of the method of operation is not deemed necessary. Hence, the general discussion set forth hereinafter is deemed adequate. Let it be assumed, however, that a web of corrugated paperboard is being fed by the web guide means 14 to the lower slitter scorer unit. Also, let it be assumed that the tools on the upper slitter scorer unit have been previously positioned for the next production order.

When the existing production order is completed, the following occurs substantially simultaneously. The rotary shear 18 shears the web. The diverter 16 is moved from the solid line position in FIG. 1 to the phantom position in FIG. 1. The tail end of the web being processed continues through the lower web path. The leading edge of the cut web is directed to the upper web path. The web channel guide means 82 and 84 are moved to an inoperative disposition so that they do not interfere with movement of the tool positioners 76, 74 respectively. The lower trim chutes 280 are moved to a position so that they do not interfere with the tool positioner 74. Pressure within the expandable chamber means 264 on each of the shafts 66, 68, 70 and 72 is removed.

Clutch 106 is disengaged and clutch 132 is engaged. Clutch 154 remains disengaged. Motor 164 is energized to move the tool positioners 74, 76 whereby each of the tool on shafts 66, 68, 70 and 72 is moved to a parking position adjacent the side frame 40. Thereafter, in a known manner, the tool positioners 74, 76 position the respective tools on their associated shafts in accordance with the requirements for the next production run. As each tool approaches its predetermined position, motor 164 is deenergized and motor 176 is energized so as to accurately position the tool. Each tool remains in the position in which it is located by reason of the frictional drag surface 262 in contact with its inner periphery. When all of the tools have been positioned on the lower slitter scorer unit for the next production run, the tool positioners 74, 76 are moved to their parking position adjacent the frame 40. The expandable chamber means 264 on each of shafts 66, 68, 70 and 72 are pressurized to simultaneously lock all the tools on their respective shafts. Thereafter, motor 190 and its corresponding motor 190' are energized so as to adjust the tools on shafts 66, 70 toward and away from their mating tools on shafts 68, 72 respectively.

The web path defined by the lower slitter scorer unit is now ready for a subsequent production order. When the production order then being processed by the upper slitter scorer unit is completed, the web 322 is again cut transversely by the rotary shear 18, the web diverter 16 is moved to a solid line position as shown in FIG. 1, clutch 106 is energized, and the web channel guide means 82, 84 are moved to their inoperative disposition as shown in FIG. 8. As soon as the tail of the then-existing order passes through the upper slitter scorer unit, clutch 132 is de-energized.

If it is desired to process a web on the auxiliary station 292, the following general sequence of events takes place. Each of the tool positioners 74 and 76 moves all of the tools on its respective shafts to the parking position. The lower trim chutes 280 are pivoted to an inoperative position as shown in FIG. 17. Motor 310 elevates the auxiliary station 292 from its inoperative position shown in FIG. 1 to its operative position in line with the lower web path as shown in FIGS. 4 and 5. As the carriage 294 approaches the position wherein gears 320 and 156 mesh with one another, a limit switch is contacted and de-energizes motor 310. Clutches 106 and 132 are deenergized while clutch 154 is energized whereby motor 96 now drives the shafts 312 and 314. The slitter and/or scorer tools on the shafts 312, 314 process the web in a conventional manner. The processed web is guided by the plates 288, 290 in a similar manner as described above.

The present invention may be embodied in other specific forms without departing from the spirit or essential attributes thereof and, accordingly, reference should be made to the appended claims, rather than to the foregoing specification, as indicating the scope of the invention.

I claim:

1. A slitter scorer comprising:
   (a) first and second upright side frames, each side frame having an upstream end and a downstream end,
   (b) an upper pair of rotatable slitter shafts downstream from an upper pair of scorer shafts, a lower pair of rotatable slitter shafts downstream from a lower pair of scorer shafts, said pairs of shafts being supported by said side frames, mating pairs of blades on each of said pairs of shafts, said upper pairs of shafts defining an upper web path, said lower pairs of shafts defining a lower web path,
   (c) a single motor supported by said first side frame and coupled by a train of gears on said first side frame to said pairs of shafts for driving all pairs of shafts, clutch means associated with each pair of shafts so that said motor may selectively drive all pairs of shafts, only the upper pairs of shafts or only the lower pairs of shafts.

2. A slitter scorer in accordance with claim 1 wherein one shaft of each pair of shafts is coupled to said single motor adjacent said first side frame and is geared to its mating shaft adjacent said second side frame.

3. A slitter scorer in accordance with claim 1 including an auxiliary station supported by said side frames for movement between an operative position and an inoperative position, said station being aligned with one of said web paths in its operative position, an auxiliary station drive gear supported by said first end frame in a position for meshing engagement with a mating gear on said auxiliary station when said auxiliary station is in its operative position, said motor being operatively coupled to said auxiliary station drive gear for driving the same, a clutch means associated with said auxiliary station drive gear for selectively disconnecting the auxiliary station drive gear from said gear train.

4. A slitter scorer in accordance with claim 1 wherein the gear fixed to each of said shafts has at least its peripheral portion containing the gear teeth made is a self-lubricating material, each gear tooth made from said self-lubricating material being meshed with a mating gear made of metal.

5. A slitter scorer in accordance with claim 1 wherein said train of gears includes a first gear continuously driven by said motor by way of a first timing belt, a second gear continuously driven by said first gear by way of a second timing belt, said first and second timing belts being disposed parallel to each other on the outer periphery of said first gear, a third gear continuously driven by said second gear by way of a third timing belt, said second and third timing belts being disposed parallel to each other on said second gear, said first gear being coupled to one shaft of each of said pairs of lower shafts, said second gear being coupled to one shaft of each of said pairs of upper shafts, said third gear being coupled to an auxiliary station drive gear.

6. A slitter scorer in accordance with claim 1 wherein said gears of said train of gears are constructed so that the slitter shafts are driven faster than the scorer shafts.

* * * * *